W. A. JOHNSON.
AUTOMATIC SWITCH FOR VEHICLES.
APPLICATION FILED APR. 13, 1912.

1,175,062.

Patented Mar. 14, 1916.
3 SHEETS—SHEET 1.

WITNESSES:
Leonard Hauerstein
G. R. Quimby

INVENTOR
William A. Johnson
BY
E. W. Marshall
ATTORNEY

W. A. JOHNSON.
AUTOMATIC SWITCH FOR VEHICLES.
APPLICATION FILED APR. 13, 1912.
1,175,062.
Patented Mar. 14, 1916.
3 SHEETS—SHEET 2.
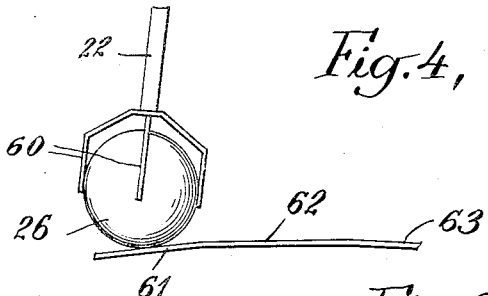
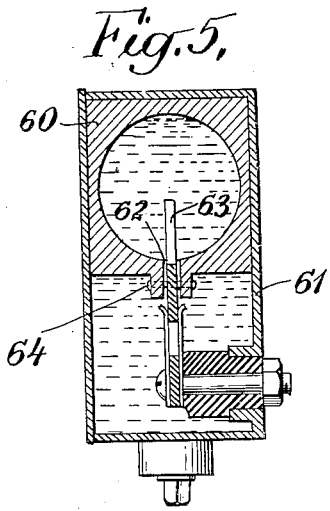
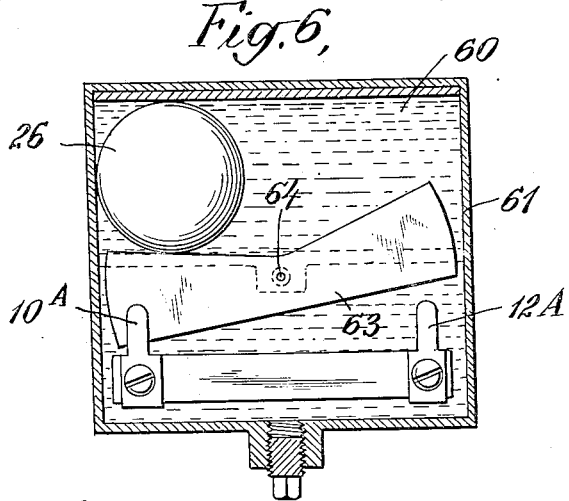
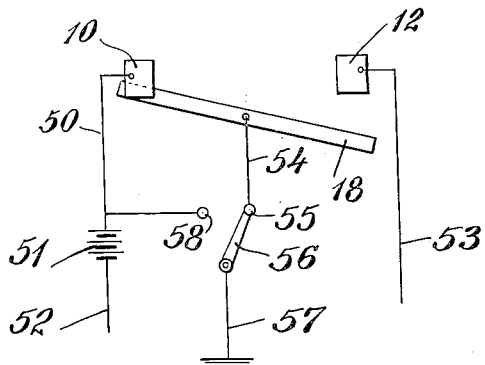
WITNESSES:
Leonard Hauerstein
G. R. Quimby
INVENTOR
William A. Johnson
BY
E. W. Marshall
ATTORNEY

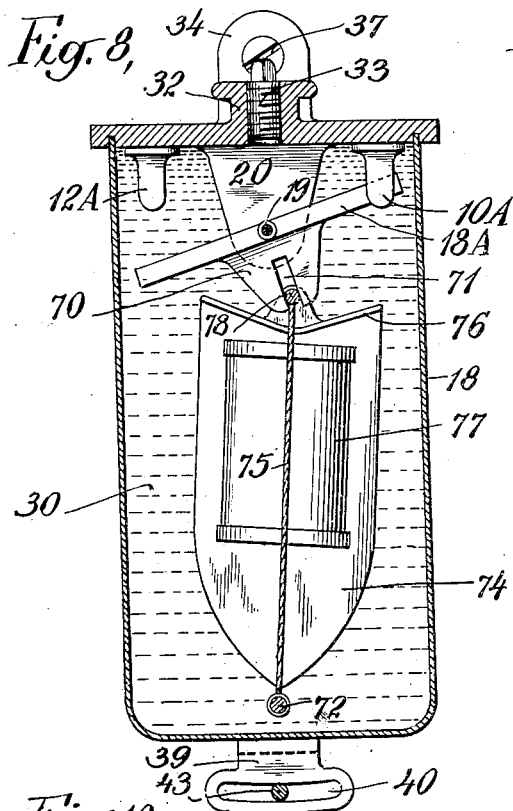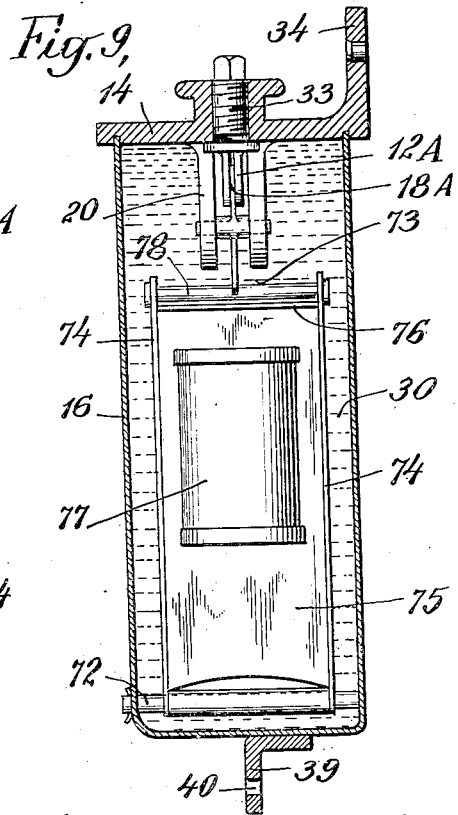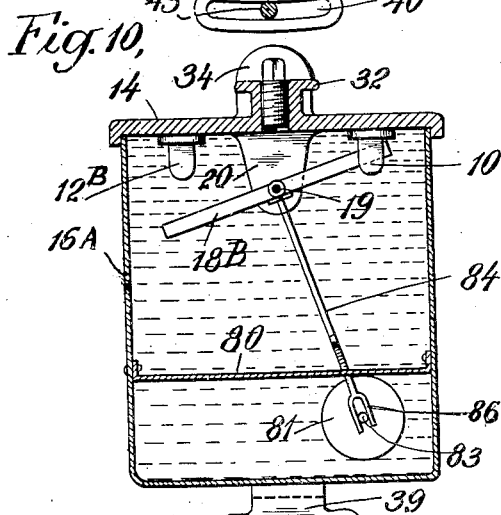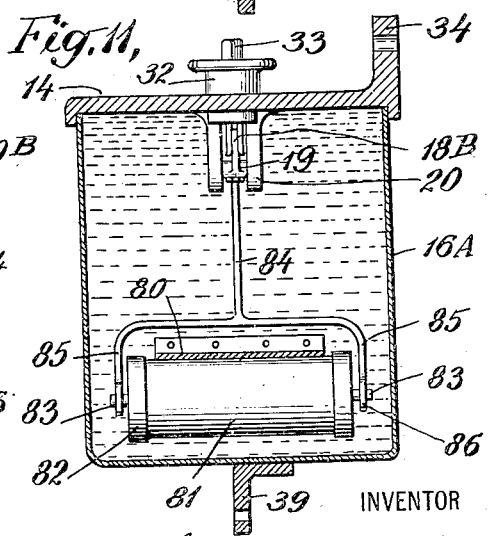

UNITED STATES PATENT OFFICE.

WILLIAM A. JOHNSON, OF YONKERS, NEW YORK.

AUTOMATIC SWITCH FOR VEHICLES.

1,175,062. Specification of Letters Patent. Patented Mar. 14, 1916.

Application filed April 13, 1912. Serial No. 690,540.

*To all whom it may concern:*

Be it known that I, WILLIAM A. JOHNSON, a citizen of the United States of America, and a resident of Yonkers, county of Westchester, and State of New York, have invented certain new and useful Improvements in Automatic Switches for Vehicles, of which the following is a specification, reference being had to the accompanying drawings, forming a part thereof.

This invention relates to an improvement in automatic switches and its object is to provide a gravity actuated switch which will automatically cut out or render inoperative the igniter circuit of a gas engine on an automobile when the vehicle is traveling down an incline, and will again close when the vehicle comes to a level or an up-grade.

I will describe my invention in the accompanying specification and point out the novel features thereof in appended claims.

Figure 1:
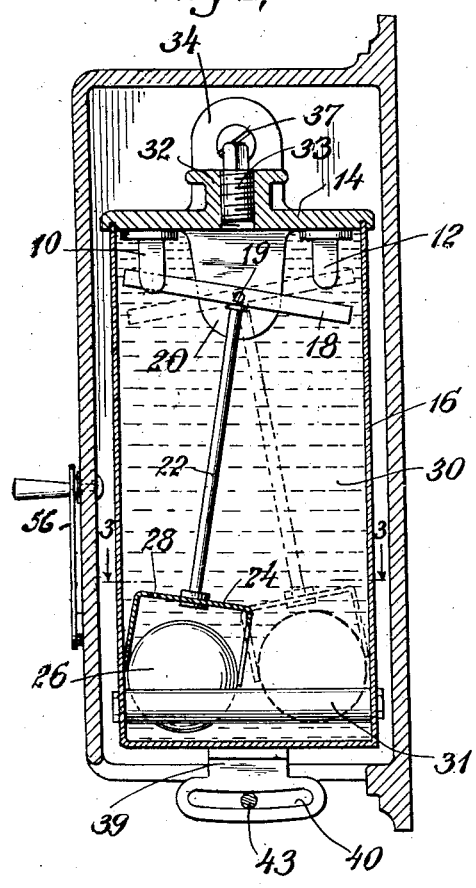
Figure 2:
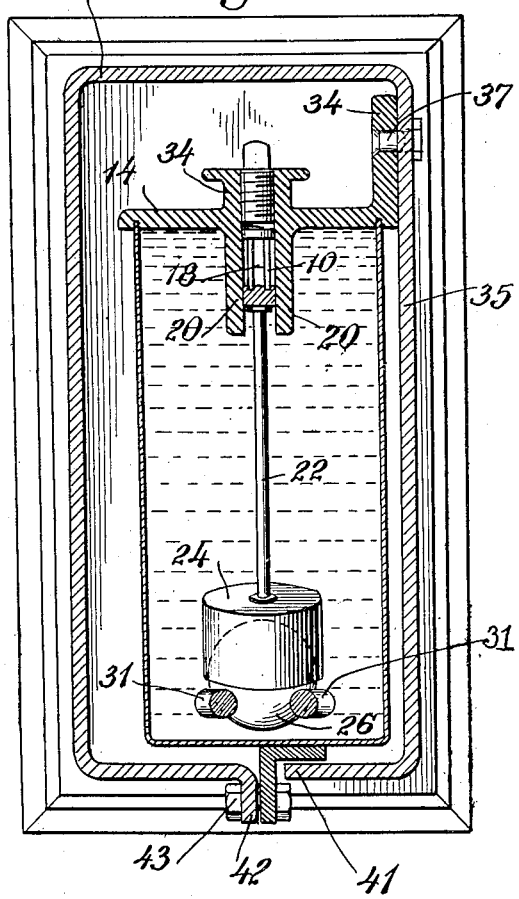
Figure 3:
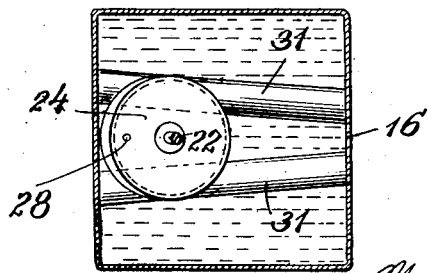

In the accompanying drawings, Figure 1 is a sectional side elevation of a device embodying my invention. Fig. 2 is a sectional front elevation of the device shown in Fig. 1. Fig. 3 is a horizontal section taken on the line 3—3 in Fig. 1. Fig. 4 is a fragmentary side elevation of a modified form of ball retainer and race-way. Fig. 5 is a sectional front view and Fig. 6 a sectional side elevation of a modified form of the invention. In Fig. 7 I have shown a diagram of certain of the ignition circuits used with an internal combustion engine, showing how my invention is used in conjunction therewith. A sectional side elevation of a different apparatus embodying my invention is shown in Fig. 8. Fig. 9 is a front elevation of the latter device. A still further modification of the invention is illustrated in Figs. 10 and 11 of which Fig. 10 is a sectional side elevation and Fig. 11 a sectional front elevation.

Like characters of reference designate corresponding parts in all of the figures.

As illustrated in Figs. 1 and 2 the switch comprises a pair of stationary contacts 10 and 12, which are mounted on a cover plate 14 of a receptacle 16. The stationary contacts 10 and 12 may each be composed of a pair of spring clips of usual construction which are adapted to coöperate with a movable contact bar or knife switch 18 supported on a pivot 19 mounted in ears 20 affixed to the under side of the cover plate 14. A stem 22 depends from the bar 18 and is provided at its lower end with an inverted cylindrical cup 24 which partially incloses a ball 26 which is of nearly the diameter of the inside of the cup. The upper end of this cup 24 is provided with a vent 28 which allows the air above the ball 26 within the cup to escape when the receptacle is filled with oil 30. The ball 26 is supported upon and adapted to travel along a track or raceway 31 composed of a pair of round rods which extend across the receptacle 16 near the bottom thereof and converge toward the right hand side of the receptacle, as may be seen in Fig. 3.

From the top of the cover plate 14 projects an internally threaded boss 32 through which the receptacle may be filled with oil or other liquid. A screw plug 33 stops this threaded hole.

At one side of the cover plate is an upwardly projecting lug 34 which rests against the side 35 of an inclosing case 36, to which side it is secured by a bolt 37. An angle bracket 39 is secured to the lower end of the receptacle 16 and the depending portion of it is provided with an elongated arcuate slot 40. The bottom wall of the inclosing casing is stopped off at 41 at one side of the bracket and the other side of this bottom wall is bent down as at 42 on the other side of the bracket. A bolt 43 passes through a hole in this bent down portion and through the slot 40. This construction provides means for adjusting the position of the receptacle relative to its inclosing casing. This casing is meant to be fastened to the dash or to some other convenient part of a motor driven vehicle, with the pivot 19 parallel with the axis of the fixed wheels thereof.

The desired adjustment may be made when the car is standing on an approximately level surface, and should be such that the ball 26 has a tendency to roll over to the left as viewed in Figs. 1 and 3.

When the vehicle upon which the switch is mounted reaches a declivity and is thereby tilted down in the front, the ball 26 tends to roll along the tracks 32 toward the right. As the ball rolls along toward the right or dotted line position, the cup 24 is pushed down over it and the liquid in the cup is displaced. This displacement is gradual and retards the movement of the ball. Consequently if the vehicle receives a sudden jolt or passes through a gully, the ball will not be moved appreciably along the track. When the ball has traveled from left to right, the contact arm 18 is separated from the contact 10 and brought into engagement with the contact 12. This causes the battery circuit to be broken and the magneto to be short-circuited as may be seen by referring to the wiring diagram, Fig. 7.

The contact 10 is connected by a wire 50 with one of the terminals of a battery 51, the other terminal 52 of which runs to the ignition system of the vehicle. The contact 12 is connected by a wire 53 with a magneto, not shown. The contact blade 18 is connected by a wire 54 to a stationary contact 55 of a hand switch 56, the pivotal part of which is connected by a wire 57 with the ground. A second stationary contact 58 into which the switch 56 may be moved, is connected to the battery 51.

Now it will be clear that when the switch arm 18 is moved as before described, from the contact 10 onto contact 12, the battery circuit will be broken and the magneto short-circuited. Then the engine will stop so that no power will be consumed while the vehicle is running down grade.

The ball 26 can run back to the left more readily than it can run to the right, first because the cylinder 24 has less of a retarding effect as the ball runs out of it, and second because on account of the divergence of the rods 32, the ball rests upon parts of its circumference farther away from its axis of rotation than it does when in its other position of rest. Consequently as soon as the car again reaches a level place, the switch arm will be moved back to its initial position and the ignition circuits for the motor will be again restored to operative condition.

The switch 56 is provided for the purpose of cutting out this apparatus. When this switch is moved off from contact 55 the magneto cannot be short-circuited, and when it is moved onto contact 58, the battery circuit cannot be interrupted, by the movement of the arm 18.

In Fig. 4 a modified form of ball retainer is shown comprising a skeleton cage or series of prongs 60 affixed to the lower end of the stem 22. The ball 26 rolls on a track composed of an upwardly inclined section 61, a level section 62, and a downwardly inclined section 63. In this case the ball is held at one end or the other of its path of travel by the inclines 61 and 63.

In the device shown in Figs. 5 and 6 there is a tubular member 60 disposed in the upper part of an inclosing casing 61 in an approximately horizontal position. The ball 26 is arranged to run back and forth in this member. In the bottom of it is a longitudinal slot 62 in which loosely fits a blade 63 which is pivotally supported at 64. The lower part of this blade forms a switch member which is arranged to be moved into contact with either a pair of spring clips 10$^A$ or a similar pair 12$^A$. The upper edge of the blade is made with two surfaces inclined to each other as shown in Fig. 6. When the ball is at the left hand end of the member 60, the blade 63 will be in contact with the clips 10$^A$. This is the condition when the vehicle to which the device is applied is running on a substantially level surface. When the ball runs over to the right as it will when the vehicle begins to run down hill, the blade will be moved out of contact with the clips 10$^A$, and into contact with the clips 12$^A$. The parts are to be connected in some such way as that illustrated in Fig. 7 and described in conjunction therewith and the operation is substantially the same. The casing 61 is to be filled with oil or other liquid so that the retarding effect previously described is present. It is obvious that this apparatus may also be adjusted as to the relation of the tubular member 60 to a horizontal plane.

Referring now to Figs. 8 and 9 I will describe another apparatus embodying my invention, with which form I have obtained good results. In this case the receptacle 16 with its cover plate 14 supporting stationary contacts 10$^A$ and 12$^A$ are made substantially like these parts as described in connection with Figs. 1 and 2, but with the relative positions of the stationary contacts interchanged. The cover plate also has depending ears in which is pivoted at 19 a switch blade 18$^A$. But in this case the switch blade is constructed with a depending lug 70 in which is a slot 71 at right angles to the blade 18$^A$.

Near the bottom of the receptacle is a pin 72 on which is pivoted an actuating device 73. This comprises two parallel side pieces 74 of thin sheet metal. These are connected by a central transverse metallic sheet 75 which forms a central wall and by a top sheet 76 which is preferably bent to lie in two oblique planes as shown in Fig. 8. The central wall is cut out to receive a hollow cylinder 77 closed at its ends and soldered into or otherwise affixed to the central wall 75. The upper central portion of the side pieces 74 are carried up to support a round transverse bar 78 which loosely fits the slot 71.

The receptacle is filled with oil or other liquid as in the previously described devices. This apparatus also works by gravity, but in this case the actuator is lighter than the surrounding liquid. It therefore has a tendency to stand up vertically with the rod 78 directly over the rod 72. The position of the receptacle relative to the horizontal or fore and aft position of the vehicle on which it is used is adjusted in the manner previously described. By giving it a rearward inclination the float actuator will cause the contact blade to remain in contact with the contact clips 10ᴬ. But when the receptacle is given a forward inclination, which it gets when the vehicle reaches a declivity, the position of the float actuator will change and will throw the switch blade 18ᴬ out of contact with the spring clips 10ᴬ and into contact with the spring clips 12ᴬ. The liquid in the receptacle serves both to float the actuator and to prevent the too rapid movement thereof, as the light structure of the actuator offers comparatively large surfaces for pocketing and acting against the liquid.

The wiring and other parts of the operation of this form of my invention are similar to those which have been described.

A still further modification of structure embodying the invention is shown in Figs. 10 and 11. In this case the receptacle 16ᴬ may be somewhat shorter. The cover plate 14 with its filling boss 32, supporting lug 34 and depending ears 20, may be the same as in the forms of the invention illustrated in Figs. 1, 2, 8 and 9. It may also be constructed with the adjusting bracket 39. The stationary contacts are in this case designated by 10ᴮ and 12ᴮ and the movable switch arm by 18ᴮ.

Across the bottom of the receptacle is a flat track 80 under which runs a cylindrical roller 81. This roller is shown with end caps 82 which form flanges of slightly larger diameter than that of the roller proper. The distance between these flanges is somewhat greater than the width of the track 80. From opposite ends of the roller project trunnions 83.

84 is a stem affixed to and depending from the switch-bar 18ᴮ. Near its lower end it is divided into two arms 85 the lower ends of which are forked as at 86 and each of which embraces one of the trunnions 83.

The receptacle is filled with liquid and the cylindrical roller is floated thereby against the track 80. The roller runs from side to side as the track is inclined in one direction or the other, and thereby actuates the switch. The liquid also causes the movement of the roller to be retarded and sluggish. If a greater retarding effect at the ends of the path of the roller is desired, a track like that shown in Fig. 4 but inverted may be used.

I have illustrated and described several modifications of my invention to show that I do not limit myself to any specific form or construction.

This invention has been described as used in conjunction with the ignition circuits of an internal combustion engine, but it is obviously applicable for use in conjunction with other types of motors for vehicles and may be so applied by any skilled mechanic.

What I claim is:

1. A switch for use on vehicles comprising a pair of stationary contacts, a movable member having two operative positions in either of which it is in engagement with one or the other of said contacts and gravity actuated means affected by the longitudinal inclination of the vehicle for moving said member from engagement with one of the contacts and into engagement with the other contact.

2. A switch for use on vehicles comprising a stationary contact, a freely swinging contact arm for engagement therewith, a gravity controlled actuator arranged to be controlled by the longitudinal inclination of the vehicle, and means for retarding the movement of the actuator.

3. A switch for use on vehicles comprising a stationary contact, a freely swinging contact arm for engagement therewith, a gravity controlled actuator arranged to be controlled by the longitudinal inclination of the vehicle, and means for adjusting the position of the switch relative to the vehicle.

4. A switch for use on vehicles comprising a pair of stationary contacts, a movable member arranged to engage either of said contacts, a gravity controlled actuator for moving said member and a casing inclosing the aforesaid elements, and adjustable means for supporting the casing upon the vehicle.

5. A switch for use on vehicles comprising a pair of stationary contacts, a movable member arranged to engage either of said contacts, a gravity controlled actuator for moving said member and a casing inclosing the aforesaid elements, said casing being filled with a liquid.

6. The combination with the ignition circuit of a gas engine in a vehicle, of a gravity controlled switch arranged to render inoperative said ignition circuit when the vehicle upon which the engine is mounted is traveling down a declivity of substantial length.

7. A switch for use on vehicles comprising a pair of stationary contacts, a pivoted arm arranged to be in engagement with one or the other of said contacts, and a rolling spherical weight arranged to be actuated by gravity to operate said pivoted arm.

8. A switch for use on vehicles comprising a pair of stationary contacts, a pivoted arm arranged to be in engagement with one or the other of said contacts, a rolling ball race, and a ball movable in said race and arranged to actuate said pivoted arm.

9. A switch comprising a receptacle filled with an insulating liquid, a pair of stationary contacts within said receptacle, a pivoted arm arranged to be in engagement with one or the other of said contacts, a ball race, a ball movable in said race, and operative connections between said ball and said pivoted arm.

10. A switch comprising a receptacle filled with an insulating liquid, a pair of stationary contacts within said receptacle, a pivoted arm arranged to coöperate with said contacts, a stem affixed to said arm near its pivot, an inverted cup on the end of said stem, a ball race in a plane tangential to a circle with said pivot as its center, a ball within said inverted cup and movable on the ball race.

11. A switch for use on vehicles comprising a pair of stationary contacts, a pivoted arm arranged to coöperate with said contacts, a ball race comprising a pair of converging rods and a ball movable in said race and arranged to actuate said pivoted arm.

12. A switch for use on vehicles comprising a pair of stationary contacts, a pivoted arm arranged to coöperate with said contacts, a ball race, a ball thereon arranged to actuate said arm, and means for adjusting the inclination of said ball race.

13. A switch comprising a receptacle filled with an insulating liquid, a pair of stationary contacts within said receptacle, a pivoted arm arranged to coöperate with said contacts, a ball race, a ball movable in said race, and operative connections between said ball and said pivoted arm; a support for the receptacle and means for adjusting the relative positions of the receptacle and its support.

14. A switch comprising a receptacle filled with an insulating liquid, a pair of stationary contacts within said receptacle, a pivoted arm arranged to coöperate with said contacts, a stem affixed to said arm near its pivot, an inverted cup on the end of said stem, a ball race comprising a pair of converging rods in a plane tangential to a circle with said pivot as its center, a ball within said inverted cup and movable on the ball race; a support for the receptacle and means for adjusting the relative positions of the receptacle and its support.

In witness whereof, I have hereunto set my hand this tenth day of April in the year 1912.

WILLIAM A. JOHNSON.

Witnesses:
GEO. H. BECKWITH,
WILLIAM J. WALLIN.